US007833944B2

(12) United States Patent
Munoz et al.

(10) Patent No.: US 7,833,944 B2
(45) Date of Patent: Nov. 16, 2010

(54) METHODS AND COMPOSITIONS USING CROSSLINKED ALIPHATIC POLYESTERS IN WELL BORE APPLICATIONS

(75) Inventors: Trinidad Munoz, Dallas, TX (US); Larry S. Eoff, Duncan, OK (US); Rajesh K. Saini, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/456,538

(22) Filed: Jun. 18, 2009

(65) Prior Publication Data

US 2009/0258798 A1  Oct. 15, 2009

Related U.S. Application Data

(63) Continuation-in-part of application No. 11/634,320, filed on Dec. 5, 2006, now Pat. No. 7,674,753, which is a continuation-in-part of application No. 10/832,163, filed on Apr. 26, 2004, now abandoned, which is a continuation-in-part of application No. 10/664,126, filed on Sep. 17, 2003.

(51) Int. Cl.
*C09K 8/12* (2006.01)
*E21B 43/04* (2006.01)

(52) U.S. Cl. .................... 507/119; 166/278; 166/305.1; 166/312; 166/376; 175/65; 507/260; 507/267

(58) Field of Classification Search ................. 507/119, 507/260, 267; 166/278, 305.1, 312, 376; 175/65
See application file for complete search history.

(56) References Cited

U.S. PATENT DOCUMENTS

| | | |
|---|---|---|
| 2,005,183 A | 6/1935 | Flemming |
| 2,238,671 A | 4/1941 | Woodhouse |
| 2,703,316 A | 3/1955 | Palmer |
| 3,173,484 A | 3/1965 | Huitt et al. |
| 3,195,635 A | 7/1965 | Fast |
| 3,272,650 A | 9/1966 | MacVittie |
| 3,302,719 A | 2/1967 | Fischer |
| 3,364,995 A | 1/1968 | Atkins et al. |
| 3,366,178 A | 1/1968 | Malone et al. |
| 3,455,390 A | 7/1969 | Gallus |
| 3,784,585 A | 1/1974 | Schmitt et al. |
| 3,819,525 A | 6/1974 | Hattenbrun |
| 3,828,854 A | 8/1974 | Templeton et al. |
| 3,836,465 A | 9/1974 | Rhudy et al. |
| 3,868,998 A | 3/1975 | Lybarger et al. |
| 3,912,692 A | 10/1975 | Casey et al. |
| 3,948,672 A | 4/1976 | Harnsberger |
| 3,955,993 A | 5/1976 | Curtice |
| 3,960,736 A | 6/1976 | Free et al. |
| 3,968,840 A | 7/1976 | Tate |
| 3,986,355 A | 10/1976 | Klaeger |
| 3,998,272 A | 12/1976 | Maly |
| 3,998,744 A | 12/1976 | Arnold et al. |
| 4,010,071 A | 3/1977 | Colegrove |
| 4,068,718 A | 1/1978 | Cooke, Jr. et al. |
| 4,169,798 A | 10/1979 | DeMartino |
| 4,172,066 A | 10/1979 | Zweigle et al. |
| 4,261,421 A | 4/1981 | Watanabe |
| 4,265,673 A | 5/1981 | Pace et al. |
| 4,267,887 A | 5/1981 | Watanabe |
| 4,299,825 A | 11/1981 | Lee |
| 4,387,769 A | 6/1983 | Erbstoesser et al. |
| 4,460,052 A | 7/1984 | Gockel |
| 4,470,915 A | 9/1984 | Conway |
| 4,498,995 A | 2/1985 | Gockel |
| 4,502,540 A | 3/1985 | Byham |
| 4,506,734 A | 3/1985 | Nolte |
| 4,521,316 A | 6/1985 | Sikorski |
| 4,526,695 A | 7/1985 | Erbstoesser et al. |
| 4,632,876 A | 12/1986 | Laird et al. |
| 4,694,905 A | 9/1987 | Armbruster |
| 4,715,967 A | 12/1987 | Bellis |
| 4,716,964 A | 1/1988 | Erbstoesser et al. |
| 4,767,706 A | 8/1988 | Levesque |
| 4,772,346 A | 9/1988 | Anderson et al. |
| 4,785,884 A | 11/1988 | Armbruster |
| 4,793,416 A | 12/1988 | Mitchell |
| 4,797,262 A | 1/1989 | Dewitz |
| 4,809,783 A | 3/1989 | Hollenbeck et al. |

(Continued)

FOREIGN PATENT DOCUMENTS

EP  0 510 762  10/1992

(Continued)

OTHER PUBLICATIONS

Office Action for U.S. Appl. No. 12/786,767 dated Jun. 25, 2010.

(Continued)

*Primary Examiner*—Timothy J. Kugel
(74) *Attorney, Agent, or Firm*—Robert A. Kent; McDermott Will & Emery LLP

(57) ABSTRACT

Methods and compositions including a method comprising: providing a treatment fluid comprising a carrier fluid and a solid particle comprising a crosslinked aliphatic polyester; and placing the treatment fluid into a subterranean formation.

20 Claims, No Drawings

U.S. PATENT DOCUMENTS

| | | | |
|---|---|---|---|
| 4,817,721 A | 4/1989 | Pober | |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | |
| 4,848,467 A | 7/1989 | Cantu et al. | |
| 4,863,980 A | 9/1989 | Cowan et al. | |
| 4,886,354 A | 12/1989 | Welch et al. | |
| 4,894,231 A | 1/1990 | Moreau et al. | |
| 4,957,165 A | 9/1990 | Cantu et al. | |
| 4,961,466 A | 10/1990 | Himes et al. | |
| 4,986,353 A | 1/1991 | Clark et al. | |
| 4,986,354 A | 1/1991 | Cantu et al. | |
| 4,986,355 A | 1/1991 | Casad et al. | |
| 5,034,139 A | 7/1991 | Reid et al. | |
| 5,082,056 A | 1/1992 | Tackett, Jr. | |
| 5,142,023 A | 8/1992 | Gruber et al. | |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | |
| 5,247,059 A | 9/1993 | Gruber et al. | |
| 5,249,628 A | 10/1993 | Surjaatmadja | |
| 5,251,697 A | 10/1993 | Shuler | |
| 5,295,542 A | 3/1994 | Cole et al. | |
| 5,304,620 A | 4/1994 | Holtmyer et al. | |
| 5,314,031 A | 5/1994 | Hale et al. | |
| 5,325,923 A | 7/1994 | Surjaatmadja et al. | |
| 5,330,005 A | 7/1994 | Card et al. | |
| 5,359,026 A | 10/1994 | Gruber | |
| 5,360,068 A | 11/1994 | Sprunt et al. | |
| 5,363,916 A | 11/1994 | Himes et al. | |
| 5,373,901 A | 12/1994 | Norman et al. | |
| 5,386,874 A | 2/1995 | Laramay et al. | |
| 5,396,957 A | 3/1995 | Surjaatmadja et al. | |
| 5,402,846 A | 4/1995 | Jennings, Jr. et al. | |
| 5,439,055 A | 8/1995 | Card et al. | |
| 5,460,226 A | 10/1995 | Lawton et al. | |
| 5,464,060 A | 11/1995 | Hale et al. | |
| 5,475,080 A | 12/1995 | Gruber et al. | |
| 5,484,881 A | 1/1996 | Gruber et al. | |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | |
| 5,499,678 A | 3/1996 | Surjaatmadja et al. | |
| 5,501,276 A | 3/1996 | Weaver et al. | |
| 5,505,787 A | 4/1996 | Yamaguchi | |
| 5,512,071 A | 4/1996 | Yam et al. | |
| 5,536,807 A | 7/1996 | Gruber et al. | |
| 5,555,936 A | 9/1996 | Pirri et al. | |
| 5,566,310 A | 10/1996 | Chan | |
| 5,591,700 A | 1/1997 | Harris et al. | |
| 5,594,095 A | 1/1997 | Gruber et al. | |
| 5,602,083 A | 2/1997 | Gabrysch et al. | |
| 5,604,186 A | 2/1997 | Hunt et al. | |
| 5,607,905 A | 3/1997 | Dobson, Jr. et al. | |
| 5,613,558 A | 3/1997 | Dillenbeck | |
| 5,670,473 A | 9/1997 | Scepanski | |
| 5,697,440 A | 12/1997 | Weaver et al. | |
| 5,698,322 A | 12/1997 | Tsai et al. | |
| 5,723,416 A | 3/1998 | Liao | |
| 5,765,642 A | 6/1998 | Surjaatmadja | |
| 5,783,527 A | 7/1998 | Dobson, Jr. et al. | |
| 5,791,415 A | 8/1998 | Nguyen et al. | |
| 5,799,734 A | 9/1998 | Normal et al. | |
| 5,833,000 A | 11/1998 | Weaver et al. | |
| 5,849,401 A | 12/1998 | El-Afandi et al. | |
| 5,853,048 A | 12/1998 | Weaver et al. | |
| 5,888,944 A | 3/1999 | Patel | |
| 5,893,416 A | 4/1999 | Read | |
| 5,908,073 A | 6/1999 | Nguyen et al. | |
| 5,916,849 A | 6/1999 | House | |
| 5,924,488 A | 7/1999 | Nguyen et al. | |
| 5,964,291 A | 10/1999 | Bourne et al. | |
| 5,977,030 A | 11/1999 | House | |
| 5,979,557 A | 11/1999 | Card et al. | |
| 5,981,447 A | 11/1999 | Chang | |
| 5,996,693 A | 12/1999 | Heathman | |
| 6,004,400 A | 12/1999 | Bishop et al. | |
| 6,024,170 A | 2/2000 | McCabe et al. | |
| 6,028,113 A | 2/2000 | Scepanski | |
| 6,047,772 A | 4/2000 | Weaver et al. | |
| 6,110,875 A | 8/2000 | Tjon-Joe-Pin et al. | |
| 6,114,410 A | 9/2000 | Betzold | |
| 6,123,159 A | 9/2000 | Brookey et al. | |
| 6,123,965 A | 9/2000 | Jacob et al. | |
| 6,131,661 A | 10/2000 | Conner et al. | |
| 6,135,987 A | 10/2000 | Tsai et al. | |
| 6,143,698 A | 11/2000 | Murphey et al. | |
| 6,148,917 A | 11/2000 | Brookey et al. | |
| 6,162,766 A | 12/2000 | Muir et al. | |
| 6,169,058 B1 | 1/2001 | Le et al. | |
| 6,172,011 B1 | 1/2001 | Card et al. | |
| 6,189,615 B1 | 2/2001 | Sydansk | |
| 6,202,751 B1 | 3/2001 | Chatterji et al. | |
| 6,209,643 B1 | 4/2001 | Nguyen et al. | |
| 6,209,646 B1 | 4/2001 | Reddy et al. | |
| 6,214,773 B1 | 4/2001 | Harris et al. | |
| 6,242,390 B1 | 6/2001 | Mitchell et al. | |
| 6,258,755 B1 | 7/2001 | House | |
| 6,260,622 B1 | 7/2001 | Blok et al. | |
| 6,291,013 B1 | 9/2001 | Gibson et al. | |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | |
| 6,323,307 B1 | 11/2001 | Bigg et al. | |
| 6,326,458 B1 | 12/2001 | Gruber et al. | |
| 6,328,105 B1 | 12/2001 | Betzold | |
| 6,330,917 B2 | 12/2001 | Chatterji et al. | |
| 6,357,527 B1 | 3/2002 | Norman et al. | |
| 6,364,945 B1 | 4/2002 | Chatterji et al. | |
| 6,380,138 B1 | 4/2002 | Ischy et al. | |
| 6,387,986 B1 | 5/2002 | Moradi-Araghi et al. | |
| 6,390,195 B1 | 5/2002 | Nguyen et al. | |
| 6,394,185 B1 | 5/2002 | Constien | |
| 6,422,314 B1 | 7/2002 | Todd et al. | |
| 6,422,326 B1 | 7/2002 | Brookey et al. | |
| 6,432,155 B1 | 8/2002 | Swazey et al. | |
| 6,454,003 B1 | 9/2002 | Chang et al. | |
| 6,485,947 B1 | 11/2002 | Rajgarhia et al. | |
| 6,488,763 B2 | 12/2002 | Brothers et al. | |
| 6,494,263 B2 | 12/2002 | Todd | |
| 6,508,305 B1 | 1/2003 | Brannon et al. | |
| 6,509,301 B1 | 1/2003 | Vollmer et al. | |
| 6,527,051 B1 | 3/2003 | Reddy et al. | |
| 6,554,071 B1 | 4/2003 | Reddy et al. | |
| 6,566,310 B2 | 5/2003 | Chan | |
| 6,569,814 B1 | 5/2003 | Brady et al. | |
| 6,578,630 B2 | 6/2003 | Simpson et al. | |
| 6,586,372 B1 | 7/2003 | Bradbury | |
| 6,599,863 B1 | 7/2003 | Palmer et al. | |
| 6,667,279 B1 | 12/2003 | Hessert et al. | |
| 6,669,771 B2 | 12/2003 | Tokiwa et al. | |
| 6,681,856 B1 | 1/2004 | Chatterji et al. | |
| 6,686,328 B1 | 2/2004 | Binder | |
| 6,691,780 B2 | 2/2004 | Nguyen et al. | |
| 6,702,023 B1 | 3/2004 | Harris et al. | |
| 6,702,044 B2 | 3/2004 | Reddy | |
| 6,710,019 B1 | 3/2004 | Sawdon et al. | |
| 6,716,797 B2 | 4/2004 | Brookey | |
| 6,737,385 B2 | 5/2004 | Todd et al. | |

| | | | | | |
|---|---|---|---|---|---|
| 6,761,218 B2 | 7/2004 | Nguyen et al. | 7,299,869 B2 | 11/2007 | Kalman |
| 6,763,888 B1 | 7/2004 | Harris et al. | 7,299,876 B2 | 11/2007 | Lord et al. |
| 6,764,981 B1 | 7/2004 | Eoff et al. | 7,303,014 B2 | 12/2007 | Reddy et al. |
| 6,770,293 B2 | 8/2004 | Angel et al. | 7,306,037 B2 | 12/2007 | Nguyen et al. |
| 6,793,018 B2 | 9/2004 | Dawson et al. | 7,322,412 B2 | 1/2008 | Badalamenti et al. |
| 6,793,730 B2 | 9/2004 | Reddy et al. | 7,353,876 B2 | 4/2008 | Savery et al. |
| 6,806,235 B1 | 10/2004 | Mueller et al. | 7,353,879 B2 | 4/2008 | Todd et al. |
| 6,817,414 B2 | 11/2004 | Lee | 7,413,017 B2 | 8/2008 | Nguyen et al. |
| 6,818,594 B1 | 11/2004 | Freeman et al. | 7,419,937 B2 | 9/2008 | Rimmer et al. |
| 6,828,280 B2 | 12/2004 | England et al. | 7,448,450 B2 | 11/2008 | Luke et al. |
| 6,837,309 B2 | 1/2005 | Boney et al. | 7,455,112 B2 | 11/2008 | Moorehead et al. |
| 6,840,318 B2 | 1/2005 | Lee et al. | 7,461,697 B2 | 12/2008 | Todd et al. |
| 6,852,173 B2 | 2/2005 | Banerjee et al. | 7,475,728 B2 | 1/2009 | Pauls et al. |
| 6,861,394 B2 | 3/2005 | Ballard et al. | 7,476,644 B2 | 1/2009 | Cooke, Jr. |
| 6,877,563 B2 | 4/2005 | Todd et al. | 7,484,564 B2 | 2/2009 | Welton et al. |
| 6,883,608 B2 | 4/2005 | Parlar et al. | 7,497,258 B2 | 3/2009 | Savery et al. |
| 6,886,635 B2 | 5/2005 | Hossaini et al. | 7,497,278 B2 | 3/2009 | Schriener et al. |
| 6,896,058 B2 | 5/2005 | Munoz, Jr. et al. | 7,501,530 B2 | 3/2009 | Todd et al. |
| 6,904,971 B2 | 6/2005 | Brothers et al. | 7,506,689 B2 | 3/2009 | Surjaatmadja et al. |
| 6,949,491 B2 | 9/2005 | Cooke, Jr. | 7,547,665 B2 | 6/2009 | Welton et al. |
| 6,953,090 B2 | 10/2005 | Vijn et al. | 7,553,800 B2 | 6/2009 | Munoz, Jr. et al. |
| 6,959,767 B2 | 11/2005 | Horton et al. | 7,595,280 B2 | 9/2009 | Welton et al. |
| 6,978,838 B2 | 12/2005 | Parlar et al. | 7,598,208 B2 | 10/2009 | Todd |
| 6,981,552 B2 | 1/2006 | Reddy et al. | 7,608,566 B2 | 10/2009 | Saini et al. |
| 6,983,798 B2 | 1/2006 | Todd | 7,608,567 B2 | 10/2009 | Saini |
| 6,983,801 B2 | 1/2006 | Dawson et al. | 7,648,946 B2 | 1/2010 | Munoz |
| 6,987,083 B2 | 1/2006 | Phillippi et al. | 7,662,753 B2 | 2/2010 | Saini |
| 6,997,259 B2 | 2/2006 | Nguyen | 2001/0016562 A1 | 8/2001 | Muir et al. |
| 7,000,701 B2 | 2/2006 | Todd et al. | 2002/0036088 A1 | 3/2002 | Todd |
| 7,007,752 B2 | 3/2006 | Reddy et al. | 2002/0119169 A1 | 8/2002 | Angel |
| 7,021,377 B2 | 4/2006 | Todd et al. | 2002/0125012 A1 | 9/2002 | Dawson |
| 7,032,663 B2 | 4/2006 | Nguyen | 2003/0054962 A1 | 3/2003 | England |
| 7,033,976 B2 | 4/2006 | Guzman | 2003/0060374 A1 | 3/2003 | Cooke |
| 7,036,586 B2 | 5/2006 | Roddy et al. | 2003/0114314 A1 | 6/2003 | Ballard |
| 7,036,587 B2 | 5/2006 | Munoz, Jr. et al. | 2003/0130133 A1 | 7/2003 | Vollmer |
| 7,044,220 B2 | 5/2006 | Nguyen et al. | 2003/0147965 A1 | 8/2003 | Bassett et al. |
| 7,044,224 B2 | 5/2006 | Nguyen | 2003/0188766 A1 | 10/2003 | Banerjee |
| 7,049,272 B2 | 5/2006 | Sinclair et al. | 2003/0230407 A1 | 12/2003 | Vijn et al. |
| 7,063,151 B2 | 6/2006 | Nguyen et al. | 2003/0234103 A1 | 12/2003 | Lee |
| 7,066,258 B2 | 6/2006 | Justus et al. | 2004/0014606 A1 | 1/2004 | Parlar |
| 7,066,260 B2 | 6/2006 | Sullivan et al. | 2004/0014607 A1 | 1/2004 | Sinclair |
| 7,069,994 B2 | 7/2006 | Cooke, Jr. | 2004/0040706 A1 | 3/2004 | Hossaini |
| 7,080,688 B2 | 7/2006 | Todd et al. | 2004/0055747 A1 | 3/2004 | Lee |
| 7,093,658 B2 | 8/2006 | Chatterji et al. | 2004/0070093 A1 | 4/2004 | Mathiowitz et al. |
| 7,093,664 B2 | 8/2006 | Todd et al. | 2004/0094300 A1 | 5/2004 | Sullivan |
| 7,096,947 B2 | 8/2006 | Todd et al. | 2004/0099416 A1 | 5/2004 | Vijn |
| 7,101,829 B2 | 9/2006 | Guichard et al. | 2004/0106525 A1 | 6/2004 | Wilbert |
| 7,131,491 B2 | 11/2006 | Blauch et al. | 2004/0138068 A1 | 7/2004 | Rimmer |
| 7,132,389 B2 | 11/2006 | Lee | 2004/0152601 A1 | 8/2004 | Still |
| 7,140,438 B2 | 11/2006 | Frost et al. | 2004/0152602 A1 | 8/2004 | Boles |
| 7,147,067 B2 | 12/2006 | Getzlaf et al. | 2004/0162386 A1 | 8/2004 | Altes |
| 7,151,077 B2 | 12/2006 | Prud'homme et al. | 2004/0170836 A1 | 9/2004 | Bond et al. |
| 7,153,902 B2 | 12/2006 | Altes et al. | 2004/0214724 A1 | 10/2004 | Todd |
| 7,156,174 B2 | 1/2007 | Roddy et al. | 2004/0216876 A1 | 11/2004 | Lee |
| 7,165,617 B2 | 1/2007 | Lord et al. | 2004/0231845 A1 | 11/2004 | Cooke, Jr. |
| 7,166,560 B2 | 1/2007 | Still et al. | 2004/0261993 A1 | 12/2004 | Nguyen |
| 7,168,489 B2 | 1/2007 | Frost et al. | 2004/0261995 A1 | 12/2004 | Nguyen |
| 7,172,022 B2 | 2/2007 | Reddy et al. | 2004/0261996 A1 | 12/2004 | Munoz |
| 7,178,594 B2 | 2/2007 | Patel | 2004/0261999 A1 | 12/2004 | Nguyen |
| 7,178,596 B2 | 2/2007 | Blauch et al. | 2005/0006095 A1 | 1/2005 | Justus |
| 7,195,068 B2 | 3/2007 | Todd | 2005/0028976 A1 | 2/2005 | Nguyen |
| 7,204,311 B2 | 4/2007 | Welton et al. | 2005/0034861 A1 | 2/2005 | Saini et al. |
| 7,204,312 B2 | 4/2007 | Roddy et al. | 2005/0034865 A1 | 2/2005 | Todd |
| 7,205,264 B2 | 4/2007 | Boles | 2005/0034868 A1 | 2/2005 | Frost |
| 7,216,705 B2 | 5/2007 | Saini et al. | 2005/0045328 A1 | 3/2005 | Frost |
| 7,219,731 B2 | 5/2007 | Sullivan | 2005/0051330 A1 | 3/2005 | Nguyen |
| 7,228,904 B2 | 6/2007 | Todd et al. | 2005/0056423 A1 | 3/2005 | Todd |
| 7,256,159 B2 | 8/2007 | Guichard et al. | 2005/0059556 A1 | 3/2005 | Munoz, Jr. et al. |
| 7,261,156 B2 | 8/2007 | Nguyen et al. | 2005/0059557 A1 | 3/2005 | Todd et al. |
| 7,264,051 B2 | 9/2007 | Nguyen et al. | 2005/0059558 A1 | 3/2005 | Blanch |
| 7,265,079 B2 | 9/2007 | Wilbert et al. | 2005/0103496 A1 | 5/2005 | Todd |
| 7,267,170 B2 | 9/2007 | Mang et al. | 2005/0126780 A1 | 6/2005 | Todd |
| 7,276,466 B2 | 10/2007 | Todd et al. | 2005/0126785 A1 | 6/2005 | Todd |

| | | | |
|---|---|---|---|
| 2005/0130848 A1 | 6/2005 | Todd et al. |
| 2005/0161220 A1 | 7/2005 | Todd |
| 2005/0167104 A1 | 8/2005 | Roddy |
| 2005/0167105 A1 | 8/2005 | Roddy |
| 2005/0167107 A1 | 8/2005 | Roddy |
| 2005/0183741 A1 | 8/2005 | Surjaatmadja et al. |
| 2005/0205258 A1 | 9/2005 | Reddy |
| 2005/0205265 A1 | 9/2005 | Todd |
| 2005/0205266 A1 | 9/2005 | Todd |
| 2005/0252659 A1 | 11/2005 | Sullivan |
| 2005/0272613 A1 | 12/2005 | Cooke |
| 2005/0277554 A1 | 12/2005 | Blauch et al. |
| 2006/0016596 A1 | 1/2006 | Pauls |
| 2006/0032633 A1 | 2/2006 | Nguyen |
| 2006/0046938 A1 | 3/2006 | Harris et al. |
| 2006/0048938 A1 | 3/2006 | Kalman |
| 2006/0065397 A1 | 3/2006 | Nguyen |
| 2006/0105917 A1 | 5/2006 | Munoz |
| 2006/0105918 A1 | 5/2006 | Munoz, Jr. et al. |
| 2006/0108150 A1 | 5/2006 | Luke |
| 2006/0118300 A1 | 6/2006 | Welton et al. |
| 2006/0169182 A1 | 8/2006 | Todd et al. |
| 2006/0169183 A1 | 8/2006 | Todd |
| 2006/0169448 A1 | 8/2006 | Savery et al. |
| 2006/0169450 A1 | 8/2006 | Mang et al. |
| 2006/0169452 A1 | 8/2006 | Savery et al. |
| 2006/0169453 A1 | 8/2006 | Savery et al. |
| 2006/0172891 A1 | 8/2006 | Todd |
| 2006/0172893 A1 | 8/2006 | Todd et al. |
| 2006/0172894 A1 | 8/2006 | Mang et al. |
| 2006/0172895 A1 | 8/2006 | Mang et al. |
| 2006/0185847 A1 | 8/2006 | Saini |
| 2006/0185848 A1 | 8/2006 | Surjaatmadja |
| 2006/0205608 A1 | 9/2006 | Todd |
| 2006/0234873 A1 | 10/2006 | Ballard |
| 2006/0243449 A1 | 11/2006 | Welton et al. |
| 2006/0247135 A1 | 11/2006 | Welton |
| 2006/0254774 A1 | 11/2006 | Saini et al. |
| 2006/0258543 A1 | 11/2006 | Saini |
| 2006/0258544 A1 | 11/2006 | Saini |
| 2006/0276345 A1 | 12/2006 | Todd et al. |
| 2006/0283597 A1 | 12/2006 | Schriener |
| 2007/0042912 A1 | 2/2007 | Welton et al. |
| 2007/0049501 A1 | 3/2007 | Saini et al. |
| 2007/0066492 A1 | 3/2007 | Funkhouser et al. |
| 2007/0066493 A1 | 3/2007 | Funkhouser et al. |
| 2007/0078063 A1 | 4/2007 | Munoz |
| 2007/0078064 A1 | 4/2007 | Munoz et al. |
| 2007/0100029 A1 | 5/2007 | Reddy et al. |
| 2007/0235190 A1 | 10/2007 | Lord |
| 2007/0238623 A1 | 10/2007 | Saini et al. |
| 2007/0281868 A1 | 12/2007 | Pauls et al. |
| 2007/0298977 A1 | 12/2007 | Mang et al. |
| 2008/0009423 A1 | 1/2008 | Mang et al. |
| 2008/0026955 A1 | 1/2008 | Munoz et al. |
| 2008/0026959 A1 | 1/2008 | Munoz et al. |
| 2008/0026960 A1 | 1/2008 | Munoz et al. |
| 2008/0027157 A1 | 1/2008 | Munoz et al. |
| 2008/0070810 A1 | 3/2008 | Mang et al. |
| 2008/0139415 A1 | 6/2008 | Todd et al. |
| 2008/0169102 A1 | 7/2008 | Carbajal et al. |
| 2009/0062157 A1 | 3/2009 | Munoz et al. |
| 2009/0258798 A1 | 10/2009 | Munoz |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| GB | 2 412 389 | 3/2004 |
| JP | 2004181820 | 7/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |
| WO | 06053936 | 5/2006 |

OTHER PUBLICATIONS

Notice of Allowance and Notice of Allowability for U.S. Appl. No. 11/634,320, dated Oct. 19, 2009.

Simmons, et al., *Poly(phenyllactide): Synthesis, Characterization, and Hydrolytic Degradation*, Biomacromolecules, vol. 2, No. 2, 2001 (pp. 658-663).

Yin, et al., *Preparation and Characterization of Substituted Polylactides*, American Chemical Society, vol. 32, No. 23, 1999 (pp. 7711-7718).

Yin, et al., *Synthesis and Properties of Polymers Derived form Substituted Lactic Acids*, American Chemical Society, Ch. 12, 2001 (pp. 147-159).

Cantu, et al, *Laboratory and Field Evaluation of a Combined Fluid-Loss-Control Additive and Gel Breaker for Fracturing Fluids*, SPE 18211, Society of Petroleum Engineers, 1990.

Love, et al, *Selectively Placing Many Fractures in Openhole Horizontal Wells Improves Production*, SPE 50422, Society of Petroleum Engineers, 1998.

McDaniel, et al, *Evolving New Stimulation Process Proves Highly Effective in Level 1 Dual-Lateral Completion*, SPE 78697, Society of Petroleum Engineers, 2002.

Albertsson, et al, *Aliphatic Polyesters: Systhesis, Properties and Applications*, Advances in Polymer Science, vol. 157, Degradable Aliphatic Polyesters, 2002.

Dechy-Cabaret, et al, *Controlled Ring-Opening Polymerization of Lactide and Glycolide*, American Chemical Society, Chemical Reviews, A-Z, AA-AD.

Funkhouser, et al, *Synthetic Polymer Fracturing Fluid for High-Temperature Applications*, SPE 80236, Society of Petroleum Engineers, 2003.

*Chelating Agents*, Encyclopedia of Chemical Technology, vol. 5 (764-795), 2001.

Vichaibun, et al, *A New Assay for the Enzymatic Degradation of Polylactic Acid, Short Report*, ScienceAsia, vol. 29, 2003 (pp. 297-300).

Halliburton, *SurgiFrac$^{SM}$ Service, A Quick and Cost-Effective Method to Help Boost Production From Openhole Horizontal Completions*, Halliburton Communications, HO3297, 2002.

Halliburton, *Cobra Frac$^{SM}$ Service, Coiled Tubing Fracturing—Cost-Effective Method for Stimulating Untapped Reserves*, HO2319R, Halliburton Energy Services, 2000.

Halliburton, *CobraJet Frac$^{SM}$ Service, Cost-effective Technology That Can Help Reduce Cost Per BOE Produced, Shorten Cycle Time and Reduce Capex*, Halliburton Communications, Apr. 2003.

Y. Chiang et al., *Hydrolysis of Ortho Esters; Further Investigation of the Factors Which Control the Rate-Determining Step*, Engineering Information, Inc. NY, NY, vol. 105, No. 23 (XP-002322842), Nov. 16, 1983.

M. Ahmad, et al., *Ortho Ester Hydrolysis: Direct Evidence for a Three-Stage Reaction Mechanism*, Engineering Information, Inc. NY, NY, vol. 101, No. 10 (XP-002322843), May 9, 1979.

Skrabal et al, *The Hydrolysis Rate of Orthoformic Acid Ethyl Ether*, Chemical Institute of the University of Graz, Jan. 13, 1921, pp. 1-38.

Heller, et al., *Poly(ortho esters)—From Concept to Reality*, Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers*, American Chemical Society, vol. 32, No. 2, 1999 (pp. 301-307).

Ng, et al., *Synthesis and Erosion Studies of Self-Catalyzed Poly(ortho ester)s*, American Chemical Society, vol. 30, No. 4, 1997 (pp. 770-772).

Ng, et al., *Development of a Poly(ortho ester) prototype With a Latent Acid in the Polymer Backbone for 5-fluorouracil Delivery*, Journal of Controlled Release 65 (2000), (pp. 367-374).

Rothen-Weinhold, et al., Release of BSA from poly(ortho ester) extruded thin strands, *Journal of Controlled Release 71*, 2001, (pp. 31-37).

Heller, et al., *Poly(ortho ester)s—their development and some recent applications*, European Journal of Pharmaceutics and Biopharmaceutics, 50, 2000, (pp. 121-128).

Heller, et al., *Poly(ortho esters); synthesis, characterization, properties and uses*, Advanced Drug Delivery Reviews, 54, 2002, (pp. 1015-1039).

Heller, et al., *Poly(ortho esters) For The Pulsed and Continuous Delivery of Peptides and Proteins*, Controlled Release and Biomedical Polymers Department, SRI International, (pp. 39-46), 1995.

Zignani, et al., *Subconjunctival biocompatibility of a viscous bioerodable poly(ortho ester)*, J. Biomed Mater Res, 39, 1998, pp. 277-285.

Toncheva, et al., *Use of Block Copolymers of Poly(Ortho Esters) and Poly (Ethylene Glycol)*, Journal of Drug Targeting, 2003, vol. 11(6), pp. 345-353.

Schwach-Abdellaoui, et al., *Control of Molecular Weight for Auto-Catalyzed Poly(ortho ester) Obtained by Polycondensation Reaction*, International Journal of Polymer Anal. Charact., 7: 145-161, 2002, pp. 145-161.

Heller, et al., *Release of Norethindrone from Poly(Ortho Esters)*, Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters*, Department of Chemistry, Indiana University, Bloomington, Indiana, Chemical Reviews, 1974, vol. 74, No. 5, pp. 581-603.

Todd, et al., *A Chemcial "Trigger" Useful for Oilfield Applications*, Society of Petroleum Engineers, Inc., SPE 92709, Feb. 4, 2005.

Kiyoshi Matsuyama et al, Environmentally benign formation of polymeric microspheres by rapid expansion of supercritical carbon dioxide solution with a nonsolvent, Environ Sci Technol 2001, 35, 4149-4155.

NatureWorks Product Bulletin entitled Nature Works PLA Polymer 3001D Injection Molding Process Guide dated 2005.

NatureWorks Product Bulletin entitled "NatureWorks PLA Polymer 4060D for Heat Seal Layer in Coextruded Oriented Films" dated 2005.

NatureWorks article entitled "Crystallizing and Drying of PLA" dated 2005.

Office Action for U.S. Appl. No. 11/634,319 dated Mar. 3, 2010.

Office Action for U.S. Appl. No. 10/664,126, dated Jul. 22, 2009.

Helminen, "Structure Modifaction and Crosslinking of Methacrylated Polylactide Oligomers," J. App. Poly. Sci. vol. 86, 3616-3624 (2002).

Office Action dated Aug. 2, 2006 from U.S. Appl. No. 10/832,163.

Office Action for U.S. Appl. No. 11/634,319, dated Jun. 16, 2009.

Office Action for U.S. Appl. No. 11/634,320, dated Jun. 16, 2009.

The International Search Report and the Written Opinion No. PCT/GB2004/003831, Dated May 9, 2005.

Office Action for U.S. Appl. No. 10/664,126 dated Aug. 3, 2010.

METHODS AND COMPOSITIONS USING CROSSLINKED ALIPHATIC POLYESTERS IN WELL BORE APPLICATIONS

CROSS-REFERENCE TO RELATED APPLICATIONS

This application is a continuation-in-part of U.S. patent application Ser. No. 11/634,320, entitled "Improved Treatment Fluids and Methods of Forming Degradable Filter Cakes and Their Use in Subterranean Formations," filed Dec. 5, 2006 now U.S. Pat. No. 7,674,753, which is a continuation-in-part of U.S. patent application Ser. No. 10/832,163, entitled "Improved Treatment Fluids and Methods of Use in Subterranean Formations," filed Apr. 26, 2004 now abandoned, which is a continuation-in-part of U.S. patent application Ser. No. 10/664,126 entitled "Improved Subterranean Treatment Fluids and Methods of Treating Subterranean Formations," filed Sep. 17, 2003, incorporated by reference herein for all purposes, and from which priority is claimed pursuant to 35 U.S.C. §120.

BACKGROUND

The present invention relates to crosslinked aliphatic polyesters and, more particularly, in certain embodiments, to methods and compositions that use crosslinked aliphatic polyesters in well bore applications, particularly in high-temperature applications.

Aliphatic polyesters are commonly employed in well bore applications. For instance, aliphatic polyesters may be used in subterranean operations as fluid loss control particles, diverting agents, bridging agents, drilling fluid additives, cement additives, and the like. In another instance, the aliphatic polyesters may be capable of releasing a desirable degradation product, e.g., an acid, during its hydrolysis. The acid released by certain aliphatic polyesters may be used to facilitate a reduction in viscosity of a fluid or to degrade a filter cake, as well as for numerous other functions in subterranean operations.

Inclusion of an aliphatic polyester capable of releasing an acid in a gelled (and optionally crosslinked) treatment fluid may be used to facilitate a reduction in viscosity of such fluid. Generally, these aliphatic polyesters likely will hydrolyze over time due to contact with water present in the fluid, thereby releasing an acid. Upon its hydrolysis, the acid will function, inter alia, to reduce the crosslinks in the treatment fluid, reducing the pH of the treatment fluid sufficiently to reverse the crosslinks therein, and/or breaking down the backbone of the gelling agent present in the treatment fluid. Typically, the acid released by the aliphatic polyester may breakdown the gelling agents, and this phenomena may be accelerated at elevated temperatures such as those above about 150° F.

Aliphatic polyesters capable of releasing an acid may also be used in the degradation of acid-soluble materials present in a subterranean formation, such as those present in or adjacent to filter cakes. Filter cakes commonly may be formed by a fluid (e.g., a treatment fluid) on the face of a portion of a subterranean formation, inter alia, to minimize damage to the permeability thereof. The filter cake often comprises an acid-soluble component (e.g., a calcium carbonate bridging agent) and a polymeric component (e.g., starch and xanthan). Before desirable fluids, such as hydrocarbons, may be produced, the filter cake is generally removed. To facilitate the degradation of the acid-soluble component, an aliphatic polyester capable of releasing an acid may be utilized. Filter cakes also may be removed using an acid where the filter cake does not contain an acid-soluble component, for example, by degrading the underlying carbonate adjacent to the filter cake, if the filter cake is present in a carbonate formation.

In one instance, the filter cake may be contacted by a treatment fluid that comprises the aliphatic polyester. The resultant acid should interact with the acid-soluble component of the filter cake and/or the underlying carbonate adjacent to the filter cake in such a way as to facilitate their degradation. In another instance, the aliphatic polyester capable of releasing an acid may be included in the fluid (such as the treatment fluid) that forms the filter cake, such that the filter cake further contains the aliphatic polyester. Subsequent contact of the filter cake with an aqueous fluid hydrolyzes the water-hydrolysable material thereby releasing an acid that acts to degrade the acid soluble component of the filter cake. Among other components, the aqueous fluid may contain oxidizing agents or enzymes suitable to facilitate the degradation of the polymeric component of the filter cake.

The use of aliphatic polyesters may be problematic in high-temperature wells. At higher temperatures, such as those above about 300° F., the use of aliphatic polyesters in subterranean formations may not be suitable. At such temperatures, the presence of aqueous fluids could lead to early hydrolysis of the aliphatic polyesters. Similarly the use of crystalline aliphatic polyesters or stereoisomers may also be problematic in high-temperature wells.

SUMMARY

The present invention relates to crosslinked aliphatic polyesters and, more particularly, in certain embodiments, to methods and compositions that use crosslinked aliphatic polyesters in well bore applications, particularly in high-temperature applications.

In one embodiment, the present invention comprises a method comprising: providing a treatment fluid comprising a carrier fluid and a solid particle comprising a crosslinked aliphatic polyester; and placing the treatment fluid into a subterranean formation.

In another embodiment, the present invention comprises a method comprising: placing a treatment fluid in a subterranean formation, the treatment fluid comprising: a carrier fluid; a viscosifier; a fluid loss control additive; and a bridging agent comprising a crosslinked aliphatic polyester; and forming a filter cake comprising the bridging agent upon a surface within the subterranean formation whereby fluid loss to the subterranean formation through the filter cake is reduced.

In another embodiment, the present invention comprises a treatment fluid comprising a carrier fluid and a solid particle comprising a crosslinked aliphatic polyester.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to crosslinked aliphatic polyesters and, more particularly, in certain embodiments, to methods and compositions that use crosslinked aliphatic polyesters in well bore applications, particularly in high-temperature applications.

There may be several potential advantages to the methods and compositions of the present invention. One of the many potential advantages of the methods and compositions of the present invention is that they may allow for, inter alia, higher temperature use in subterranean formations than methods and compositions that use uncrosslinked aliphatic polyesters. Another potential advantage of the methods and compositions of the present invention is that they may allow use in subterranean formations where longer degradation times are needed at higher temperatures, such as for use as diverting particles, filter cakes, fluid loss control additives, drill in fluids, or bridging agents. Methods of treating subterranean formations are described in U.S. Patent Application Publication Nos. 2007/0078064, 2005/0059556, and 2005/0059557, the entireties of which are herein incorporated by reference. Another potential advantage of the methods and compositions of the present invention is that crosslinking may also increase the heat stability of polyesters above the Tg and also increase the melting point of the polymer. In some instances it may be desirable for the polyesters to retain some of their solid particle properties past the Tg, Tc, or Tm of the aliphatic polyester.

Embodiments of the treatment fluids of the present invention generally comprise a carrier fluid and a solid particle comprising a crosslinked aliphatic polyester. The carrier fluid utilized in embodiments of the treatment fluids of the present invention may be aqueous-based, nonaqueous-based, or mixtures thereof. Where the carrier fluid is aqueous-based, the water used may be fresh water, salt water (e.g., water containing one or more salts dissolved therein), brine (e.g., saturated salt water), or seawater. Generally, the water may be from any source, provided that it does not contain an excess of compounds that may adversely affect other components in the treatment fluid. Where the carrier fluid is nonaqueous-based, the carrier fluid may comprise any number of organic fluids. Examples of suitable organic fluids include, but are not limited to, mineral oils, synthetic oils, esters and the like. These organic fluids may be referred to generically as "oils." Generally, any oil in which a water solution of salts can be emulsified may be suitable for use as a carrier fluid in the treatment fluids of the present invention. Generally, the carrier fluid may be present in embodiments of the treatment fluids of the present invention in an amount in the range of about 20% to about 99% by weight of the treatment fluid. In certain embodiments, the carrier fluid may be present in the treatment fluids of the present invention in an amount in the range of about 20% to about 80% by weight of the treatment fluid.

The solid particle that comprises the crosslinked aliphatic polyester may be included in the treatment fluids of the present invention in an amount sufficient for a particular application. In certain embodiments, the solid particle may be present in an amount in the range of about 0.1% to about 32% by weight of the treatment fluid. In certain embodiments, the solid particle may be present in an amount of about 1% to about 10% by weight of the treatment fluid.

The specific features of the solid particle may be modified based on the particular application. For example, where used in forming a filter cake, the specific features of the solid particle may be modified so as to maintain the filter cake's filtering capability when the filter cake is intact while easing the removal of the filter cake when such removal becomes desirable. In certain embodiments, the solid particle may have a particle size distribution in the range of about 0.1 micron to about 1.0 millimeters. Furthermore, the solid particle may have any suitable shape, including, but not limited to, particles having the physical shape of platelets, shavings, flakes, ribbons, rods, strips, spheroids, toroids, pellets, tablets, or any other physical shape. One of ordinary skill in the art with the benefit of this disclosure will recognize the appropriate size and shape for a given application.

As previously mentioned, the solid particles included in embodiments of the treatment fluids may comprise a crosslinked aliphatic polyester. Suitable crosslinked aliphatic polyesters for use in embodiments of the present invention include those formed by crosslinking aliphatic polyesters having the general formula of repeating units shown below:

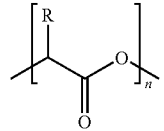

Formula I where n is an integer between 75 and 10,000 and R is a hydrogen, alkyl, aryl, alkylaryl, acetyl, heteroatoms, or mixtures thereof. Of these aliphatic polyesters, poly(lactic acid) is preferred. Poly(lactic acid) is synthesized either from lactic acid by a condensation reaction or more commonly by ring-opening polymerization of a cyclic lactide monomer. Since both lactic acid and lactide can achieve the same repeating unit, the general term poly(lactic acid), as used herein, refers to Formula I without any limitation as to how the polymer was made, such as from lactides, lactic acid, or oligomers, and without reference to the degree of polymerization or level of plasticization. The lactide monomer exists generally in three different forms: two stereoisomers L- and D-lactide and racemic D,L-lactide (meso-lactide). The oligomers of lactic acid and oligomers of lactide are defined by the formula:

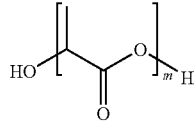

Formula II where m is an integer $2 \leq m \leq 75$. Preferably m is an integer and $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. The use of poly(L-lactide) could be desirable in applications of the present invention where a slower degradation of the degradable particulates is desired. Poly(D,L-lactide) may be a more amorphous polymer with a resultant faster hydrolysis rate. The use of poly(D,L-lactide) may be suitable for other applications where a more rapid degradation may be appropriate. The stereoisomers of lactic acid may be used individually or combined to be used in accordance with embodiments of the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified to be used in embodiments of the present invention by, inter alia, blending, copolymerizing or otherwise mixing the stereoisomers, blending, copolymerizing or otherwise mixing high and low molecular weight poly(lactides), or by blending, copolymerizing or otherwise mixing a poly(lactic acid) with another polyester or polyesters.

Plasticizers may be used in embodiments of the aliphatic polyesters of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include, but are not limited to, derivatives of oligomeric lactic acid, selected from the group defined by the formula:

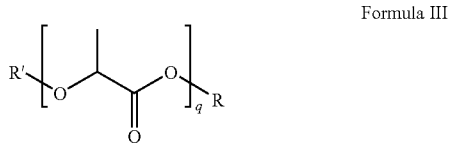

Formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer: $2 \leq q \leq 75$; and mixtures thereof. In certain exemplary embodiments, q is an integer: $2 \leq q \leq 10$. As used herein, the term "derivatives of oligomeric lactic acid" includes derivatives of oligomeric lactide.

The physical properties of aliphatic polyesters depend on several factors, including, inter alia, the composition of the repeat units, flexibility of the chain, presence of polar groups, molecular mass, degree of branching, crystallinity, and orientation. For example, short-chain branches reduce the degree of crystallinity of polymers while long-chain branches lower the melt viscosity and impart, inter alia, elongational viscosity with tension-stiffening behavior. The properties of the material utilized further can be tailored by blending, and copolymerizing it with another polymer, or by changing the macromolecular architecture (e.g., hyper-branched polymers, star-shaped, or dendrimers, etc.). The properties of any such suitable aliphatic polyesters (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the aliphatic polyesters.

By way of example and not limitation, certain crosslinked aliphatic polyesters may be prepared via a two-step process that includes polymerizing and/or functionalizing an aliphatic polyester to form a functionalized aliphatic polyester and crosslinking the molecules of the functionalized aliphatic polyester. Examples of processes that may be used to prepare crosslinked aliphatic polyesters that may be suitable for use in embodiments of the present invention are described in an article entitled "Structure Modification and Crosslinking of Methacrylated Polylactide Oligomers" by Antti O. Helminen et al. in *The Journal of Applied Polymer Science*, Vol. 86, pages 3616-3624 (2002), and WIPO Patent Application Publication No. WO 2006/053936 by Jukka Seppälä, the relevant disclosures of which are herein incorporated by reference.

For example, a degradable aliphatic polyester may be polymerized to include different numbers of hydroxyl functional groups, or an existing aliphatic polyester may be functionalized with different numbers of hydroxyl functional groups, to form a functionalized aliphatic polyester having one or more carbon-carbon double bonds. These functional groups may be provided via reaction of the aliphatic polyester with a functionalizing agent that may comprise one or more diols, polyfunctional alcohols, dicarboxylic acids, polyfunctional carboxylic acids, anhydrides, derivatives thereof, and combinations thereof. The choice of a particular functionalizing agent used may depend on several factors that will be recognized by a person of ordinary skill in the art with the benefit of this disclosure, including, but not limited to, the molecular structure and/or size of the functionalized aliphatic polyester desired. After at least one functionalized aliphatic polyester is generated, a crosslinking initiator and/or energy source may be used to form a radical at the double-bond site, and these radicals formed on different molecules of the functionalized aliphatic polyester may interact with each other so as to form one or more crosslinks between them. The crosslinking initiator may comprise any substance that is capable of forming a radical on the functionalized aliphatic polyester. Examples of suitable crosslinking initiators may include organic peroxy compounds (e.g., diazyl peroxides, peroxy esters, peroxy dicarbonates, monoperoxy carbonates, diperoxy ketals, dialkyl peroxides, sulfonyl peroxides, ketone peroxides, and peroxy carboxylic acids), inorganic peroxides (e.g., hydrogen peroxide, oxygen, ozone, and azo compounds), redox initiators, derivatives thereof, and combinations thereof. Suitable energy sources may comprise a heat source, a light source, a radiation source, and combinations thereof. The energy sources suitable for use in embodiments of the present invention may vary by numerous different properties and settings, including but not limited to, wavelength of light produced, intensity of light produced, amount of heat produced, and the like. In certain embodiments, the light source may comprise an instrument that is capable of emitting blue light (e.g., light having a wavelength of about 400 nm to about 500 nm).

In certain embodiments of the present invention where this method of preparing the crosslinked aliphatic polyester is used, the crosslinking initiator may be formulated to remain inactive until it is "activated" by, among other things, certain conditions in the fluid (e.g., pH, temperature, etc.) and/or contact with some other substance. In some embodiments, the crosslinking initiator may be delayed, for example, by encapsulation with a coating that delays its release until a desired time or place. A degradable polymer or a fatty acid may be used as the coating. The choice of a particular crosslinking initiator and/or energy source will be governed by several considerations that will be recognized by one skilled in the art, including but not limited to the following: the type of functionalized aliphatic polyester included, the molecular weight of the functionalized aliphatic polyester, the pH of the treatment fluid, temperature, and/or the desired time at which to crosslink the aliphatic polyester. The exact type and amount of crosslinking initiator and/or the particular parameters of the energy source used depends upon the specific aliphatic polyester to be crosslinked, formation temperature conditions, and other factors recognized by those individuals skilled in the art, with the benefit of this disclosure.

Optionally, a crosslinking accelerator may be used, inter alia, to increase the rate at which the functionalized aliphatic polyesters form crosslinks. Examples of suitable crosslinking accelerators that may be used include, but are not limited to, metal compounds (e.g., cobalt compounds), organic amines, and the like. The choice of whether to use a crosslinking accelerator, and, if used, the exact type and amount of the crosslinking accelerator is within the ability of those individuals skilled in the art, with the benefit of this disclosure.

In certain embodiments, the solid particles used in the treatment fluids of the present invention may comprise a degradable aliphatic polyester and a hydrated organic or inorganic compound. Examples of such hydrated organic or inorganic compounds include, but are not limited to, sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic polymers, or cellulose-based hydrophilic polymers. In certain exemplary embodiments, the degradable aliphatic polyester is poly (lactic acid). In certain exemplary embodiments, the hydrated organic or inorganic compound is sodium acetate trihydrate. In certain exemplary embodiments, the lactide units of the aliphatic polyester and releasable water from the hydrated organic or inorganic compound may be present in stoichiometric amounts. In certain exemplary embodiments, the bridging agent comprises a degradable aliphatic polyester and a hydrated organic or inorganic compound in combination with a bridging agent that comprises calcium carbonate in an amount in the range of about 1 pound to about 100 pounds of calcium carbonate per barrel of treatment fluid.

In some embodiments, the treatment fluids of the present invention may further comprise a viscosifier. Viscosifiers suitable for use in embodiments of the present invention include, but are not limited to, biopolymers (e.g., xanthan, succinoglycan, and diutan), clarified biolpymers, cellulose, cellulose derivatives (e.g., hydroxyethylcellulose), guar, and guar derivatives (e.g., hydroxypropyl guar). Commercially available examples of suitable viscosifiers include, but are not limited to, those that are available from Halliburton Energy Services, Inc., of Duncan, Okla., under the trade name "WG-37" and "N-VIS™." Suitable viscosifiers may also include an organophilic clay, a synthetic oil-soluble polymer, or a polymeric fatty acid. An example of a synthetic oil-soluble polymer is commercially available from Halliburton Energy Services, Inc., of Houston, Tex., under the trade name "BARAPAK®." An example of a polymeric fatty acid is commercially available from Halliburton Energy Services, Inc., of Houston, Tex., under the trade name "X-VIS™."

In certain embodiments, a viscosifier should be included in the degradable polymer composition in an amount sufficient to provide a desired degree of solids suspension or viscosity. In some embodiments, a viscosifier may be included in the degradable polymer composition in an amount in the range of about 0.001% to about 2% by volume. In other embodiments, a viscosifier may be included in the degradable polymer composition in an amount in the range of about 0.001% to about 1% by volume.

In some embodiments, the treatment fluids of the present invention may further comprise a fluid loss control additive. Generally, any fluid loss control additive may be suitable for use in the treatment fluids of the present invention. Examples of suitable fluid loss control additives include, but are not limited to, synthetic oil-soluble polymers, powdered hydrocarbon resins, organophilic lignite, starches, starch ether derivatives, hydroxyethylcellulose, cross-linked hydroxyethylcellulose, and combinations thereof. An example of a synthetic oil-soluble polymer is commercially available from Halliburton Energy Services, Inc., of Houston, Tex., under the trade name "BARAPAK®." In certain exemplary embodiments, the fluid loss control additive may be a synthetic oil-soluble copolymer commercially available from Halliburton Energy Services, Inc., under the trade name "ADAPTA™."

In some embodiments, the fluid loss control additive may be present in the treatment fluids of the present invention in an amount sufficient to provide a desired degree of fluid loss control. In certain embodiments, the fluid loss control additive may be present in the treatment fluids in an amount in the range of about 0.01% to about 5% by weight. In some embodiments, the fluid loss control additive is present in the subterranean treatment fluid in an amount in the range of about 1% to about 2% by weight.

In accordance with embodiments of the present invention, the treatment fluids of the present invention that comprise a crosslinked aliphatic polyester may be used in any of a variety of suitable applications. By way of example, the crosslinked aliphatic polyesters may be used in subterranean applications, including, but not limited to, drilling, completion, stimulation, and workover operations. Among other things, the crosslinked aliphatic polyesters may be used in subterranean operations as fluid loss control additives, diverting agents, bridging agents, drilling fluid additives, cement additives, and the like. An example method of the present invention generally may comprise providing a treatment fluid comprising a carrier fluid and a solid particle that comprises a crosslinked aliphatic polyester; and introducing the treatment fluid into a well bore having a bottom hole circulating temperature of at least about 300° F. In certain embodiments, the method further may comprise allowing the crosslinked aliphatic polyester to degrade thereby releasing an acid. In certain embodiments, the acid released during hydrolysis of the crosslinked aliphatic polyester may be utilized in a well bore application, such as to facilitate a reduction in viscosity of a fluid or to degrade a filter cake, as well as for numerous other functions in subterranean operations.

Embodiments of the present invention may include using the crosslinked aliphatic polyesters as a bridging agent. An example of a method of the present invention comprises the steps of: placing a treatment fluid in a subterranean formation, the treatment fluid comprising a carrier fluid and a solid particle comprising the aliphatic polyester. The treatment fluid may further comprise a viscosifier and a fluid loss control additive. In certain embodiments, the treatment fluid may be used as a drilling fluid, in that the treatment fluid may be circulated in a well bore while drilling. In certain embodiments, the method may include forming a filter cake comprising the solid particle upon a surface. Fluid loss to the formation through the filter cake may be reduced. As the filter cake comprises the aliphatic polyester, the filter cake may be "self degrading," in accordance with embodiments of the present invention, in that the filter cake may be removed without assistance of a separate "clean up" solution or "breaker" through the well bore. Though the filter cake formed by the treatment fluids in accordance with embodiments of the present invention may be self degrading, an operator nevertheless occasionally may elect to circulate a separate clean-up solution or breaker through the well bore under certain circumstances, to enhance the rate of degradation of the filter cake. By way of example, removal of the filter cake may be enhanced by contacting the filter cake with water.

Another example of a method of the present invention comprises a method of degrading a filter cake in a subterranean formation, the filter cake having been deposited therein by a treatment fluid comprising a bridging agent, comprising the step of utilizing a bridging agent comprising a degradable material comprising a crosslinked aliphatic polyester. Another example of a method of the present invention comprises a method of drilling an open hole in a subterranean formation, comprising the steps of: circulating through a drill pipe and drill bit a treatment fluid comprising a viscosified fluid, a fluid loss control additive, and a bridging agent comprising a degradable material comprising a crosslinked aliphatic polyester; forming a filter cake comprising the bridging agent upon a surface within the formation; and permitting the filter cake to degrade. The filter cake formed by the treatment fluids of the present invention is removed after a desired amount of time by being contacted with a degrading agent. In certain embodiments, the degrading agent comprises water. The source of the degrading agent may be, inter alia, a treatment fluid, such as a gravel pack fluid or a completion brine, for instance. In certain embodiments, the source of the degrading agent may be the bridging agent itself. For example, the bridging agent may comprise a water-containing compound. Any compound containing releasable water may be used as the water-containing compound. As referred to herein, the term "releasable water" will be understood to mean water that may be released under desired downhole conditions, including, inter alia, temperature. In certain embodiments, the water-containing compound may be sodium acetate trihydrate, sodium borate decahydrate, sodium carbonate decahydrate, or the like. In certain preferred embodiments, the water-containing compound is sodium acetate trihydrate.

Embodiments of the present invention may include using the crosslinked aliphatic polyester as a diverting agent. In one embodiment, the present invention provides a method comprising: providing a treatment fluid; adding to the treatment fluid a diverting agent comprising a solid particle comprising a crosslinked aliphatic polyester; and placing the treatment fluid into a portion of subterranean formation. The solid particle comprising the crosslinked aliphatic polymer may the divert treatment fluids introduced into the treated portion of the subterranean formation.

Embodiments of the present invention may include using the crosslinked aliphatic polyester as a fluid loss control particle. In one embodiment, the present invention provides a method of providing fluid loss control comprising: providing a treatment fluid comprising a carrier fluid and a solid particle comprising a crosslinked aliphatic polyester; and placing the treatment fluid into a well bore that penetrates subterranean formation. The presence of the solid particle comprising the crosslinked aliphatic polyester in the treatment fluid may reduce the loss of fluid from the treatment fluid into the subterranean formation.

Embodiments of the present invention may include using the crosslinked aliphatic polyesters to generate an acid downhole. In one embodiment, the present invention provides a method comprising: providing a treatment fluid that comprises a carrier fluid and a solid particle comprising a crosslinked aliphatic polyester; placing the treatment fluid into a subterranean formation; and allowing an acid to generate from the crosslinked aliphatic polyester. As will be appreciated by those of ordinary skill in the art, with the benefit of this disclosure, the crosslinked aliphatic polyester should undergo degradation and degrade downhole to release an acid. The term "degradation" refers to both the two relatively extreme cases of hydrolytic degradation that the crosslinked aliphatic polyester may undergo, e.g., bulk erosion and surface erosion, and any stage of degradation in between these two. This degradation can be a result of, inter alia, a chemical or thermal reaction, or a reaction induced by radiation.

Embodiments of the present invention may include using the crosslinked aliphatic polyesters to degrade a filter cake. In one embodiment, the present invention provides a method of degrading a filter cake comprising: introducing a treatment fluid that comprises a carrier fluid and a solid particle comprising a crosslinked aliphatic polyester into the subterranean formation; allowing the crosslinked aliphatic polyester to generate an acid; allowing the acid to degrade at least a portion of the filter cake.

Embodiments of the present invention may include using the crosslinked aliphatic polyesters to facilitate a reduction of viscosity of a fluid. In one embodiment, the present invention provides a method comprising: providing a servicing fluid having a viscosity and comprising a carrier fluid and a solid particle comprising a crosslinked aliphatic polyester. In certain embodiments, to provide the servicing fluid with an increased viscosity, the servicing fluid may comprise a gelling agent and/or a crosslinking agent. The method may comprise introducing the servicing fluid into a subterranean formation. The method may comprise allowing the crosslinked aliphatic polyester to release an acid, thereby reducing the viscosity of the servicing fluid. The acid released by the crosslinked aliphatic polyester may reduce the viscosity of the servicing fluid, in certain embodiments, due to a pH reduction. One should note that the conditions of the fluid, e.g., the basicity or acidity of the fluid, will affect the hydrolysis of the crosslinked aliphatic polyester.

Embodiments of the present invention may include using the crosslinked aliphatic polyesters as a cement additive. An example of a method of the present invention is a method that comprises: providing a cement composition that comprises hydraulic cement, a solid particle comprising a crosslinked aliphatic polyester, and water; placing the cement composition in a subterranean formation, allowing the cement composition to set therein. The method may comprise allowing the crosslinked aliphatic polyester to release an acid.

Embodiments of the present invention may include using the crosslinked aliphatic polyester as a biodegradable downhole tool. In one embodiment, the present invention is directed to a disposable downhole tool comprising a crosslinked aliphatic polyester. The biodegradable downhole tool may comprise a plug that is used in a well stimulation/fracturing operation, commonly known as a "frac plug." A frac plug is a temporary plug that substantially blocks off permeable zones to prevent loss of fluid into those permeable zones or to protect those zones from damage during a well stimulation/fracturing operation. Examples of suitable biodegradable downhole tools are described in U.S. Pat. No. 7,093,664, the entirety of which is hereby incorporated by reference.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "about a to about b," or, equivalently, "approximately a to b," or, equivalently, "approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
providing a treatment fluid comprising a carrier fluid and a solid particle comprising a crosslinked aliphatic polyester; and
placing the treatment fluid into a subterranean formation.

2. The method of claim 1 comprising allowing the crosslinked aliphatic polyester to release an acid.

3. The method of claim 2, wherein the acid released by the crosslinked aliphatic polyester contacts a filter cake present in the subterranean formation, such that at least a portion of the filter cake is degraded.

4. The method of claim 2, wherein treatment fluid has a viscosity, and wherein the acid released by the crosslinked aliphatic polyester reduces the viscosity of the treatment fluid.

5. The method of claim 1, wherein the treatment fluid comprises a fluid loss control additive.

6. The method of claim 5, wherein the fluid loss control additive is present in the treatment fluid in an amount in the range of from about 0.01% to about 5% by weight of the treatment fluid.

7. The method of claim 1, wherein the carrier fluid comprises at least one fluid selected from the group consisting of: an aqueous based fluid, a nonaqueous based fluid, and a mixture thereof.

8. The method of claim 1, wherein the carrier fluid is present in an amount in the range of from about 20% to about 99% by weight of the treatment fluid.

9. The method of claim 1, wherein the solid particle is present in an amount in the range of from about 0.1% to about 32% by weight of the treatment fluid.

10. The method of claim 1, wherein the solid particle has a particle size distribution in the range of from about 0.1 microns to about 1.0 millimeters.

11. The method of claim 1, wherein the solid particle comprises crosslinked poly(lactic acid).

12. The method of claim 1, wherein the solid particle comprises a hydrated organic or inorganic compound.

13. The method of claim 1, wherein in the treatment fluid comprises a viscosifier.

14. A method comprising:
placing a treatment fluid in a subterranean formation, the treatment fluid comprising:
a carrier fluid;
a viscosifier;
a fluid loss control additive; and
a bridging agent comprising a crosslinked aliphatic polyester; and
forming a filter cake comprising the bridging agent upon a surface within the subterranean formation whereby fluid loss to the subterranean formation through the filter cake is reduced.

15. The method of claim 14 further comprising contacting the filter cake with a clean-up solution or breaker.

16. The method of claim 15 wherein the clean-up solution comprises water.

17. The method of claim 14, wherein the bridging agent comprises crosslinked poly(lactic acid).

18. The method of claim 14, wherein the treatment fluid comprises a drilling fluid.

19. The method of claim 14, wherein the filter cake is self degrading.

20. A treatment fluid comprising a carrier fluid and a solid particle comprising a crosslinked aliphatic polyester.

* * * * *